(12) United States Patent
Andersen

(10) Patent No.: US 7,905,025 B1
(45) Date of Patent: Mar. 15, 2011

(54) STUD MARKING DEVICE

(75) Inventor: Derek Andersen, Fort Worth, TX (US)

(73) Assignee: Derek Andersen

( * ) Notice: Subject to any disclaimer, the term of this patent is extended or adjusted under 35 U.S.C. 154(b) by 0 days.

(21) Appl. No.: 09/480,520

(22) Filed: Jan. 7, 2000

(51) Int. Cl.
*G01B 3/12* (2006.01)

(52) U.S. Cl. .................. 33/38; 33/772; 33/782

(58) Field of Classification Search .............. 33/37, 38, 33/772, 773, 774, 775, 779, 780, 781, 782, 33/734, 735, 737, 739, 740
See application file for complete search history.

(56) References Cited

U.S. PATENT DOCUMENTS

| | | | | |
|---|---|---|---|---|
| 2,451,595 A | * | 10/1948 | Wheeler | 33/36 |
| 2,662,292 A | * | 12/1953 | Pickard | 33/781 |
| 3,006,273 A | * | 10/1961 | Sommer | 33/32.1 |
| 3,046,884 A | * | 7/1962 | Pearson | 33/36 |
| 3,063,370 A | * | 11/1962 | Eberhardt | 33/36 |
| 3,251,132 A | * | 5/1966 | Hall | 33/781 |
| 3,577,918 A | | 5/1971 | Wayfield | |
| 3,616,541 A | | 11/1971 | Crayton | |
| 3,835,543 A | | 9/1974 | Polydoris et al. | |
| 4,176,458 A | * | 12/1979 | Dunn | 33/781 |
| 4,275,264 A | * | 6/1981 | Houck | 33/773 |
| 4,377,850 A | * | 3/1983 | Simpson | 33/773 |
| 4,680,864 A | * | 7/1987 | Heagerty | 33/775 |
| 4,967,484 A | * | 11/1990 | Nosek | 33/781 |
| 4,989,326 A | * | 2/1991 | O'Malley | 33/37 |
| 4,989,342 A | | 2/1991 | Nosek | |
| 5,067,249 A | * | 11/1991 | Terrigno | 33/773 |
| 5,115,569 A | * | 5/1992 | Kubo | 33/773 |
| 5,416,978 A | * | 5/1995 | Kaufman | 33/770 |
| D383,399 S | | 9/1997 | Cragie et al. | |
| 5,749,522 A | | 5/1998 | Smrt | |
| 5,780,846 A | * | 7/1998 | Angilella et al. | 33/773 |
| 5,884,240 A | * | 3/1999 | Edgar et al. | 33/780 |
| 6,249,987 B1 | * | 6/2001 | Gorfu | 33/781 |

* cited by examiner

Primary Examiner — Diego Gutierrez
Assistant Examiner — Madeline Gonzalez

(57) ABSTRACT

A stud marking device for easily and quickly marking locations of studs. The stud marking device includes a handle having a tubular base member having a pair of prong-like members extending outwardly from a bottom thereof, and further having three telescopic members slidably and lockingly extended within one another, and further includes a wheel being of many different sizes and being rotatably mounted to the prong-like members. As a first embodiment, the wheel has a bore radially extended through the circumference with a marker being threaded in the bore and having a marking end which extends outwardly beyond the circumference. As a second embodiment, the base member has an extended portion with a keypad member mounted thereto, an LCD display and driver disposed therein, a microcontroller having read only memory disposed in the extended portion, a spring-loaded marker disposed in a bottom of the extended portion, and a plurality of marker-triggering members securely and spacedly disposed on one side of the wheel for triggering the release of the spring-loaded marker to mark the locations of the studs.

1 Claim, 4 Drawing Sheets

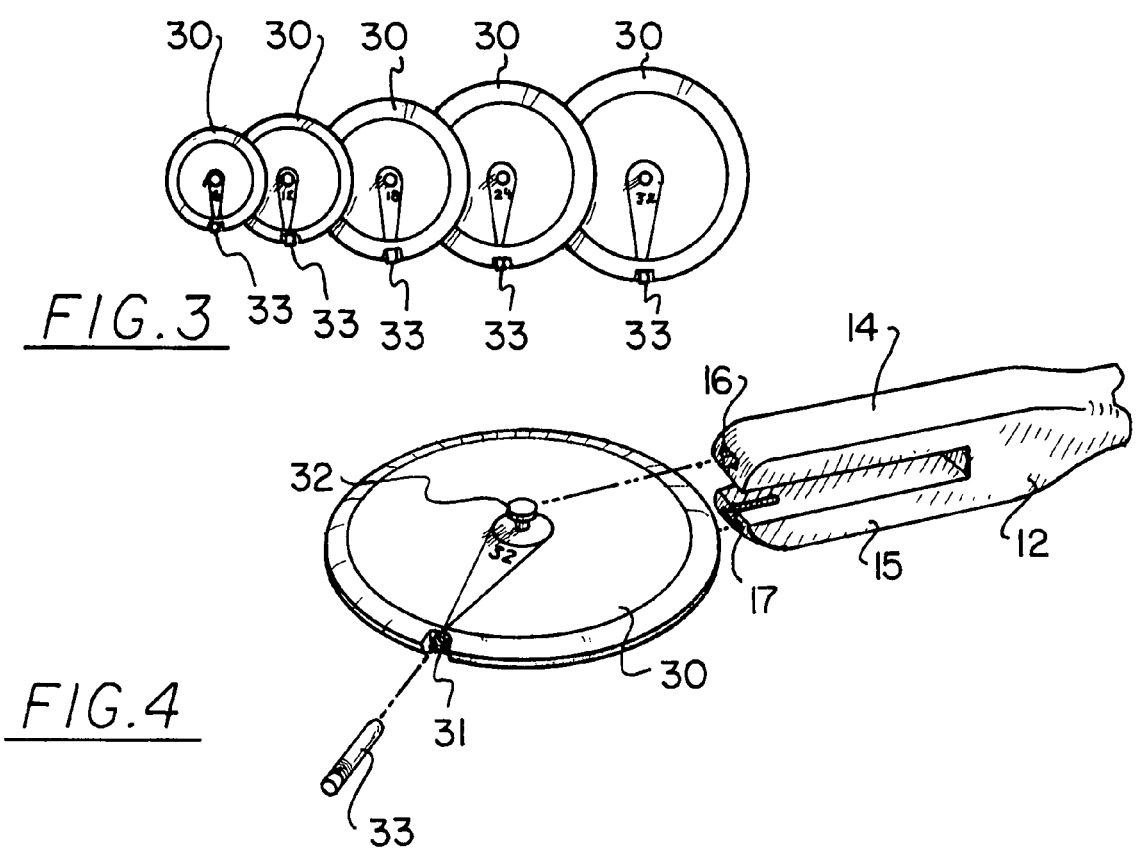

STUD MARKING DEVICE

BACKGROUND OF THE INVENTION

1. Field of the Invention

The present invention relates to a stud marker and more particularly pertains to a new stud marking device for easily and quickly marking locations of studs.

2. Description of the Prior Art

The use of a stud marker is known in the prior art. More specifically, a stud marker heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,577,918; U.S. Pat. No. 5,749,522; U.S. Pat. No. Des. 383,399; U.S. Pat. No. 4,989,342; U.S. Pat. No. 3,835,543; and U.S. Pat. No. 3,616,541.

While these devices fulfill their respective, particular objectives and requirements, the aforementioned patents do not disclose a new stud marking device. The inventive device includes a handle having a tubular base member having a pair of prong-like members extending outwardly from a bottom thereof, and further having three telescopic members slidably and lockingly extended within one another, and further includes a wheel being of many different sizes and being rotatably mounted to the prong-like members. As a first embodiment, the wheel has a bore radially extended through the circumference with a marker being threaded in the bore and having a marking end which extends outwardly beyond the circumference. As a second embodiment, the base member has an extended portion with a keypad member mounted thereto, an LCD display and driver disposed therein, a microcontroller having read only memory disposed in the extended portion, a spring-loaded marker disposed in a bottom of the extended portion, and a plurality of marker-triggering members securely and spacedly disposed on one side of the wheel for triggering the release of the spring-loaded marker to mark the locations of the studs.

In these respects, the stud marking device according to the present invention substantially departs from the conventional concepts and designs of the prior art, and in so doing provides an apparatus primarily developed for the purpose of easily and quickly marking locations of studs.

SUMMARY OF THE INVENTION

In view of the foregoing disadvantages inherent in the known types of a stud marker now present in the prior art, the present invention provides a new stud marking device construction wherein the same can be utilized for easily and quickly marking locations of studs.

The general purpose of the present invention, which will be described subsequently in greater detail, is to provide a new stud marking device which has many of the advantages of the stud marker mentioned heretofore and many novel features that result in a new stud marking device which is not anticipated, rendered obvious, suggested, or even implied by any of the prior art a stud marker, either alone or in any combination thereof.

To attain this, the present invention generally comprises includes a handle having a tubular base member having a pair of prong-like members extending outwardly from a bottom thereof, and further having three telescopic members slidably and lockingly extended within one another, and further includes a wheel being of many different sizes and being rotatably mounted to the prong-like members. As a first embodiment, the wheel has a bore radially extended through the circumference with a marker being threaded in the bore and having a marking end which extends outwardly beyond the circumference. As a second embodiment, the base member has an extended portion with a keypad member mounted thereto, an LCD display and driver disposed therein, a microcontroller having read only memory disposed in the extended portion, a spring-loaded marker disposed in a bottom of the extended portion, and a plurality of marker-triggering members securely and spacedly disposed on one side of the wheel for triggering the release of the spring-loaded marker to mark the locations of the studs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new stud marking device which has many of the advantages of the stud marker mentioned heretofore and many novel features that result in a new stud marking device which is not anticipated, rendered obvious, suggested, or even implied by any of the prior art a stud marker, either alone or in any combination thereof.

It is another object of the present invention to provide a new stud marking device which may be easily and efficiently manufactured and marketed.

It is a further object of the present invention to provide a new stud marking device which is of a durable and reliable construction.

An even further object of the present invention is to provide a new stud marking device which is susceptible of a low cost of manufacture with regard to both materials and labor, and which accordingly is then susceptible of low prices of sale to the consuming public, thereby making such stud marking device economically available to the buying public.

Still yet another object of the present invention is to provide a new stud marking device which provides in the apparatuses and methods of the prior art some of the advantages thereof, while simultaneously overcoming some of the disadvantages normally associated therewith.

Still another object of the present invention is to provide a new stud marking device for easily and quickly marking locations of studs.

Yet another object of the present invention is to provide a new stud marking device which includes a handle having a tubular base member having a pair of prong-like members extending outwardly from a bottom thereof, and further having three telescopic members slidably and lockingly extended within one another, and further includes a wheel being of many different sizes and being rotatably mounted to the prong-like members. As a first embodiment, the wheel has a bore radially extended through the circumference with a marker being threaded in the bore and having a marking end which extends outwardly beyond the circumference. As a second embodiment, the base member has an extended portion with a keypad member mounted thereto, an LCD display and driver disposed therein, a microcontroller having read only memory disposed in the extended portion, a spring-loaded marker disposed in a bottom of the extended portion, and a plurality of marker-triggering members securely and spacedly disposed on one side of the wheel for triggering the release of the spring-loaded marker to mark the locations of the studs.

Still yet another object of the present invention is to provide a new stud marking device that provides accurate and pain-free measurements of stud locations.

Even still another object of the present invention is to provide a new stud marking device that substantially saves times and is efficient.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the various wheels of the present invention.

FIG. 4 is an exploded detailed perspective view of prong-like members and the wheel of the present invention.

DESCRIPTION OF THE PREFERRED EMBODIMENT

Figure 1:
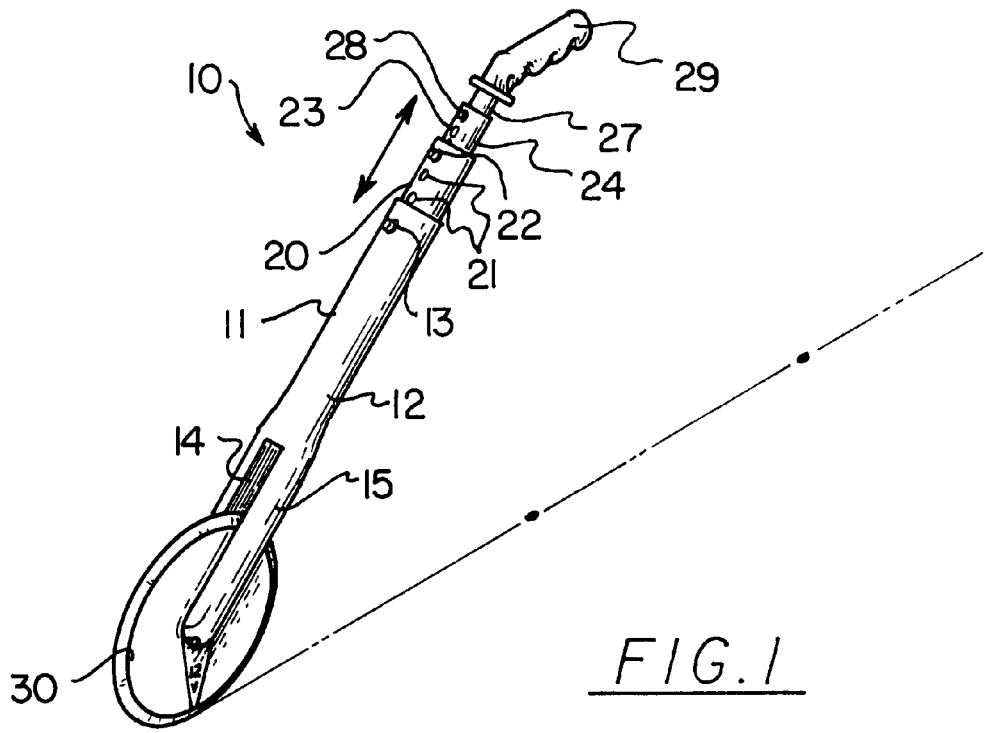
FIG. 1 is a perspective view of a new stud marking device according to the present invention.
Figure 2:
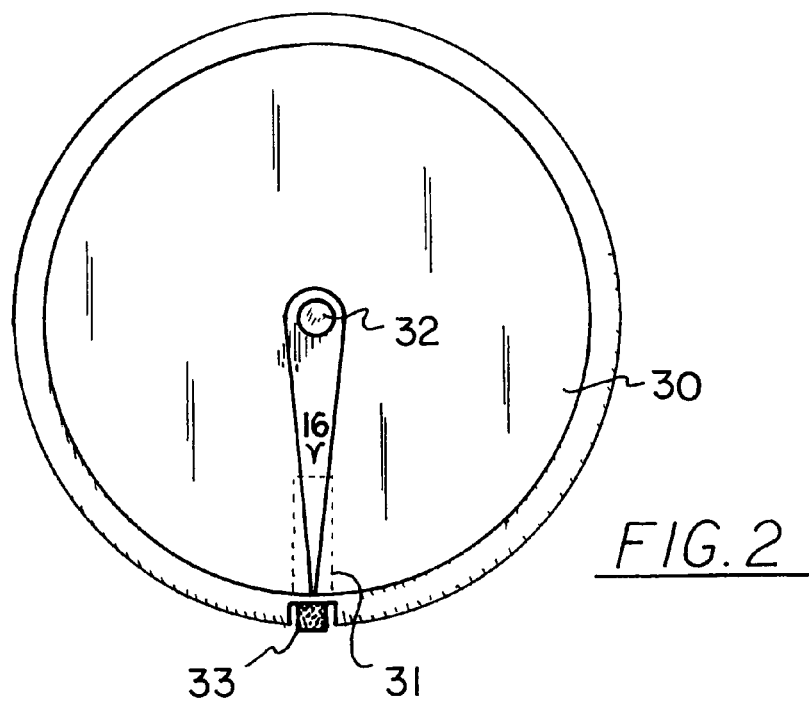
FIG. 2 is a side elevational view of the wheel of the present invention.
Figure 5:
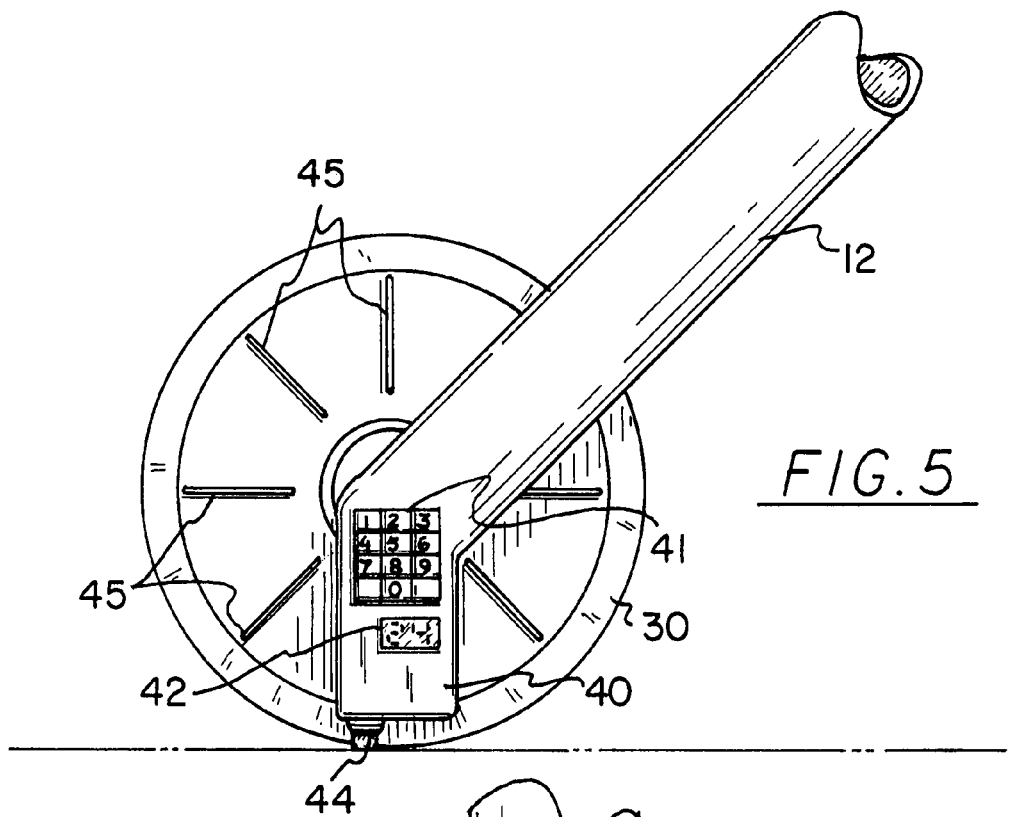
FIG. 5 is a side elevational view of the second embodiment of the present invention.
Figure 6:
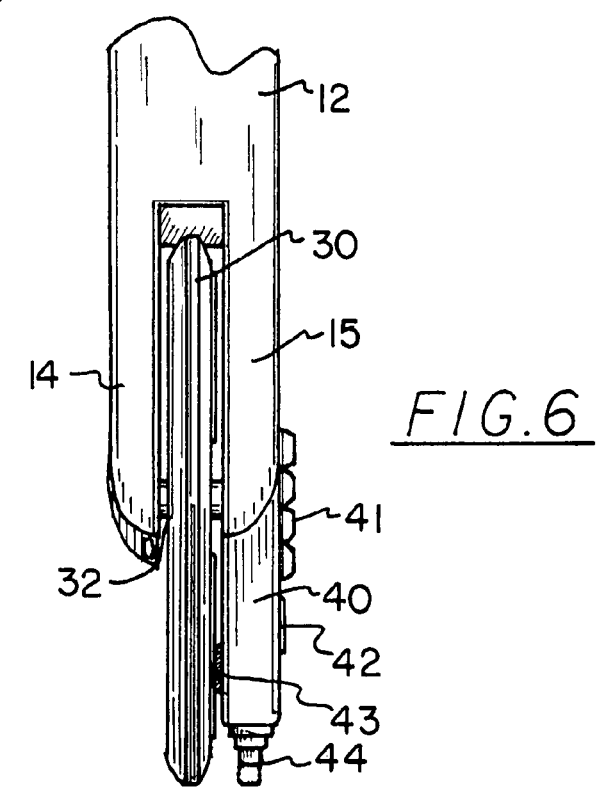
FIG. 6 is an end elevational view of the second embodiment of the present invention.
Figure 7:
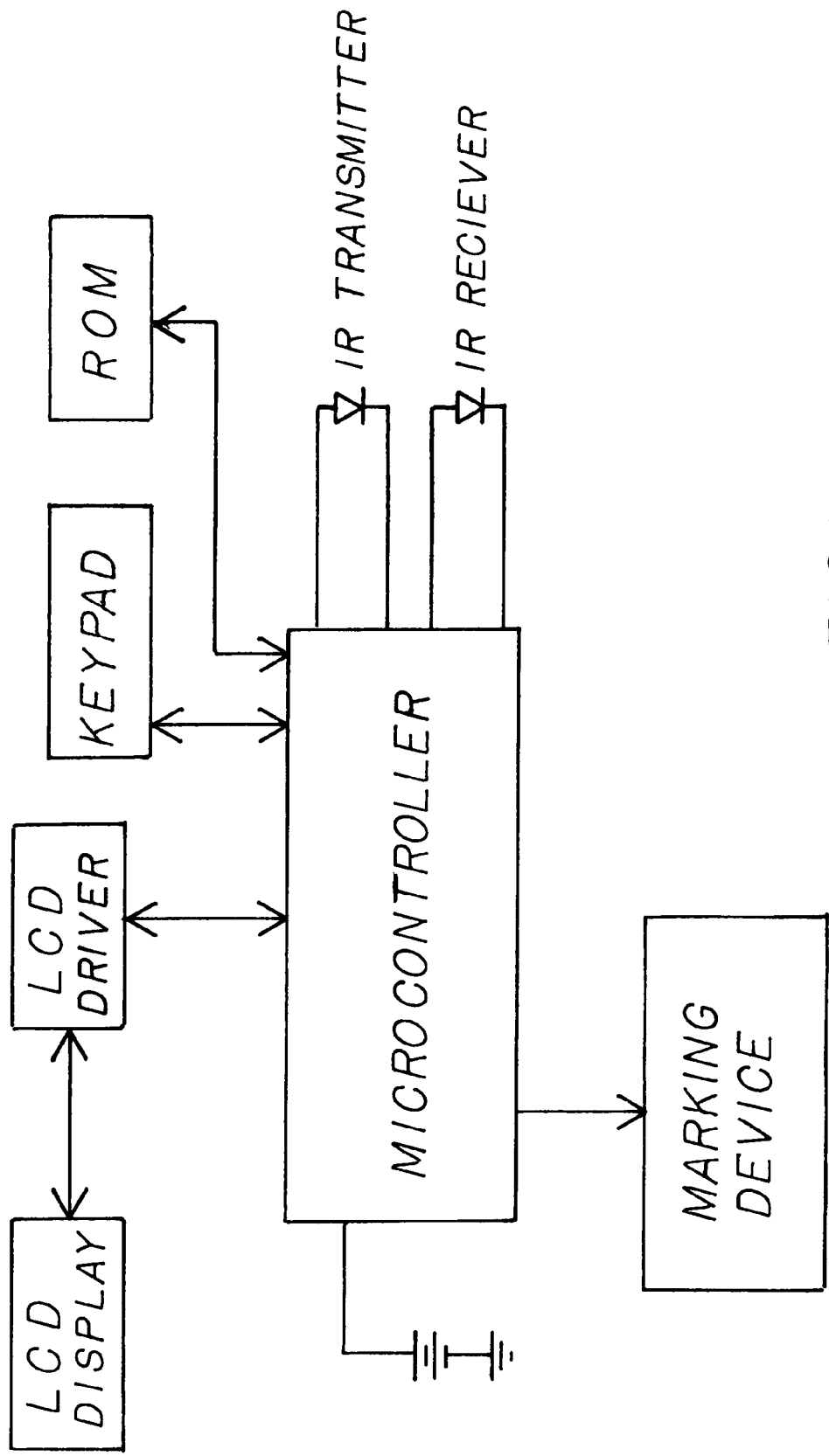
FIG. 7 is a schematic diagram of the second embodiment of the present invention.

With reference now to the drawings, and in particular to FIGS. 1 through 7 thereof, a new stud marking device embodying the principles and concepts of the present invention and generally designated by the reference numeral 10 will be described.

As best illustrated in FIGS. 1 through 7, the stud marking device 10 generally comprises a handle 11 including a tubular base member 12 having a pair of prong-like members 14,15 spaced apart and integrally extending from a bottom end thereof, and further including a plurality of telescopic members slidably disposed within one another including the tubular base member 12. The telescopic members includes a first tubular member 20 having a plurality of holes 21 spaced therealong and extending through a wall thereof with the first tubular member 20 being slidably and lockingly extended in the base member 12 with a fastening member 13, and further includes a second tubular member 24 also having a plurality of holes 23 spaced therealong and extending through a wall thereof with the second tubular member 24 being slidably and lockingly extended in the first tubular member 20 with another fastening member 22, and also includes a third elongate member 27 having a hand-hold member 29 securely and conventionally disposed at an end thereof with the third elongate member 27 being slidably and lockingly extended in the second tubular member 24 with yet another fastening member 28. The base member 12 further includes a pair of slots 16,17 each of which extends in a bottom end of a respective one of the prong-like members 14,15.

A means for marking stud locations includes a wheel 30 rotatably mounted to the base member 12 and being extended between the prong-like members 14,15, and further includes an axle member 32 securely and centrally and conventionally attached to either side of the wheel 30 and being adapted to being removeably retained in the slots 16,17 in the base member 12.

As a first embodiment, the wheel 30 includes a bore 31 extending in a circumference thereof, and the means for marking stud locations also includes a marker 33 threaded in the bore 31 and having a marking end which extends slightly outwardly beyond the circumference of the wheel 30 for marking a stud location upon a surface.

As a second embodiment, the base member 12 includes an extended portion 40 integrally extending outwardly and angled from one of the prong-like members 14,15 and including a housing. The means for marking stud locations includes a keypad member 41 securely and conventionally mounted to the extended portion 40 for selecting a desired location of a stud upon a surface, an LCD display 42 conventionally disposed in the extended portion 40 and readable by a user, a microcontroller 43 including read only memory and being conventionally disposed within the extended portion and being conventionally connected to the LCD display 42 and to the keypad member 41, a spring-loaded marker 44 which is biasedly-disposed in a bottom end of the extended portion 40 for marking stud locations, and a plurality of marker-triggering members 45 spacedly and conventionally disposed or welded upon one side of the wheel 30 for triggering the microcontroller 43 which releases the spring-loaded marker 44 to extend outwardly beyond the circumference of the wheel 30 for marking a surface. The marker-triggering members 45 are essentially rib-like members extending radially of the wheel 30 and being spaced approximately one inch apart as measured along the circumference of the wheel 30. The means for marking stud locations further includes an LCD driver conventionally disposed within the extended portion 40 and connected to the microcontroller 43 which further includes an IR transmitter and IR receiver.

In use, the user can extend the handle 11 up to 55 inches as desired by the user and either select the size of the wheel 30 needed to mark the locations of the studs on a particular surface, or key in the desired locations of the studs in the keypad member 41, and when the wheel 30 reaches the desired locations, the marker-triggering members 45 will trigger the microcontroller which will release the spring-loaded marker 44 which will mark the location on the surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stud marking device comprising:

a handle including a tubular base member having a pair of prong-like members spaced apart and integrally extending from a bottom end thereof, and further including a plurality of telescopic members slidably disposed within one another including said tubular base member, said telescopic members including a first tubular member having a plurality of holes spaced therealong and extending through a wall thereof, said first tubular member being slidably and lockingly extended in said base member, and further including a second tubular member also having a plurality of holes spaced therealong and extending through a wall thereof, said second tubular member being slidably and lockingly extended in said first tubular member, and also including a third elongate member having a hand-hold member securely disposed at an end thereof, said third elongate member being slidably and lockingly extended in said second tubular member, said base member further including a pair of slots each of which extends in a bottom end of a respective one of said prong-like members; and a means for marking stud locations including a wheel rotatably mounted to said base member and being extended between said prong-like members, said wheel having a perimeter for rolling on a ground surface, said means including a marker device mounted on said wheel and having a marking end positioned at the circumference of said wheel such that said marking end contacts the ground surface as said wheel is rolled on the ground surface and said marking end marks the ground surface with marks spaced at a distance substantially equal to an extent of the circumference of said wheel, said means for marking stud locations further including an axle member securely and centrally attached to either side of said wheel and being removably retained in said slots in said base member, wherein said wheel is removably mounted on said base member, and wherein said means for marking stud locations includes a plurality of wheels, each said wheel of said plurality of wheels having a circumference with a circumference extent with a measurement different from other wheels of said plurality of wheels such that distances between markings produced by each wheel of said plurality of wheels are different from wheel to wheel;

wherein one wheel of said plurality of wheels has a circumferential extent measuring approximately 16 inches such that marks made by said marking device are separated by approximately 16 inches;

wherein one wheel of said plurality of wheels has a circumferential extent measuring approximately 12 inches such that marks made by said marking device are separated by approximately 12 inches;

wherein one wheel of said plurality of wheels has a circumferential extent measuring approximately 24 inches such that marks made by said marking device are separated by approximately 24 inches;

wherein one wheel of said plurality of wheels has a circumferential extent measuring approximately 18 inches such that marks made by said marking device are separated by approximately 18 inches; and wherein one wheel of said plurality of wheels has a circumferential extent measuring approximately 6 inches such that marks made by said marking device are separated by approximately 6 inches.

* * * * *